United States Patent [19]

Helgorsky et al.

[11] Patent Number: 4,724,129
[45] Date of Patent: Feb. 9, 1988

[54] METHOD OF RECOVERING GALLIUM FROM VERY BASIC SOLUTIONS BY LIQUID/LIQUID EXTRACTION

[75] Inventors: Jacques Helgorsky, Frepillon; Alain Leveque, Paris, both of France

[73] Assignee: Rhone-Poulenc Industries, Paris, France

[21] Appl. No.: 937,239

[22] Filed: Dec. 3, 1986

Related U.S. Application Data

[63] Continuation of Ser. No. 687,570, Dec. 28, 1984, abandoned, which is a continuation of Ser. No. 170,978, Jul. 18, 1980, abandoned, which is a continuation of Ser. No. 824,068, Aug. 12, 1977, abandoned.

[30] Foreign Application Priority Data

Sep. 27, 1976 [FR] France .................. 76 29009

[51] Int. Cl.⁴ .............................................. C22B 58/00
[52] U.S. Cl. .................. 423/112; 423/658.5; 75/101 BE
[58] Field of Search ............................ 423/112, 658.5; 75/101 BE

[56] References Cited

U.S. PATENT DOCUMENTS

| | | | |
|---|---|---|---|
| 3,637,711 | 1/1972 | Budde et al. | 75/101 BE |
| 3,971,843 | 7/1976 | Helgorsky et al. | 423/112 |
| 4,559,203 | 12/1985 | Bauer et al. | 74/101 BE |
| 4,587,111 | 5/1986 | Wynn | 75/101 BE |

OTHER PUBLICATIONS

March ", Advanced Organic Chemistry", 2nd Edition, pp. 32-37, at pp. 32-35 & 37, McGraw-Hill (1977).
Fieser & Fieser, "Advanced Organic Chemistry", p. 759, Reinhold Publishing (1961).
March, "Advanced Organic Chemistry", Supra, at p. 1050.
March, "Advanced Organic Chemistry", Supra, at p. 1074.
"Chemical Reviews", 71, No. 2, p. 233, 1971.
Mijs et al, "Organic Syntheses by Oxidation with Metal Compounds", p. 782, Plenum Press (1986).
Morrison and Boyd, "Organic Chemistry", Second Edition, p. 803, Allyn and Bacon (1970).
Nebergall et al, "College Chemistry", Raytheon Education Co., Boston, 1968, pp. 390-400.
Noller, "Chemistry of Organic Compounds," W. B. Saunders Co., Philadelphia, 1951, pp. 38 and 47.

Primary Examiner—Patrick P. Garvin
Assistant Examiner—Paige C. Harvey
Attorney, Agent, or Firm—Burns, Doane, Swecker & Mathis

[57] ABSTRACT

The method of recovering gallium from very basic solutions such as sodium aluminum liquors from the Bayer process by liquid/liquid extraction by means of an organic phase, preferably formed of an organic solvent and water-insoluble alkylhydroxyquinolines of the general formula

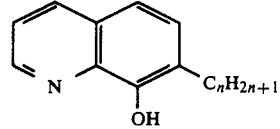

in which n is a number between 5 and 20.

23 Claims, No Drawings

METHOD OF RECOVERING GALLIUM FROM VERY BASIC SOLUTIONS BY LIQUID/LIQUID EXTRACTION

This application is a continuation of application Ser. No. 687,570, filed Dec. 18, 1984 now abandoned, which is a continuation of application Ser. No. 170,978, filed July 18, 1980 now abandoned, which is a continuation of application Ser. No. 824,068, filed Aug. 12, 1977 now abandoned.

The invention relates to a method of recovering gallium from very basic solutions by liquid/liquid extraction.

In our previously issued U. S. Pat. No. 3,971,843 description is made of the recovery of gallium present in aqueous alkaline solutions which also contain compounds of aluminum and sodium, by liquid/liquid extraction using substituted hydroxyquinolines. The method is applied more particularly to the recovery of the gallium in sodium aluminate lyes from the Bayer process, using $\beta$ alkenyl 8-hydroxy quinolines. The gallium recovery method described in the aforementioned patent includes a stage of extraction proper and a stage where the solvent is regenerated and the gallium recovered by means of strong acids. There are two preferred ways of carrying out the process, depending ont he acid used and its concentration in the stage where the solvent charged with gallium is regenerated. In the first embodiment, the preferred method of recovering the gallium present in very basic aqueous solutions also containing compounds of aluminum and sodium includes the following phases:

putting the aqueous solution into contact with a water-insoluble substituted hydroxyquinoline in solution in a water-insoluble organic solvent as represented by halogenated or non-halogenated aliphatic and aromatic hydrocarbons, so that the gallium and a certain quantity of sodium and aluminum pass from the aqueous phase to the organic phase separating the organic phase from the aqueous phase putting the organic phase into contact with a dilute aqueous solution of an acid to extract the sodium and aluminum from the organic phase, the gallium remaining in solution in the said organic phase separating the organic phase from the aqueous phase and putting the remaining organic phase into contact with a more concentrated aqueous acid solution, to extract the gallium from the organic phase into the aqueous phase separating the gallium from the aqueous phase.

The acids used are preferably hydrochloric, sulphuric and nitric acid. The concentration of the dilute aqueous acid solution is preferably from 0.4 M to 0.8 M and the concentration of the more concentrated aqueous acid solution is preferably above 1.6 M. But in cases where hydrochloric acid is used, the concentration is preferably from 1.3 M to 2.2 M and more particularly from 1.6 to 1.8.

In a second embodiment, the preferred method of recovering the gallium comprises the following phases:

putting the aqueous solution into contact with a water-insoluble substituted hydroxyquinoline in solution in a water-insoluble organic solvent as represented by halogenated or non-halogenated aliphatic and aromatic hydrocarbons, in such a way that the gallium and a certain quantity of sodium and aluminum pass from the aqueous phase to the organic phase, separating the organic phase from the aqueous phase putting the organic phase into contact with a concentrated aqueous solution of an acid capable of chelating (complexing) the gallium in anionic form, the gallium remaining in solution in the organic phase while the sodium and aluminum pass into the aqueous phase separating the organic from the aqueous phase and putting the remaining organic phase into contact with a dilute aqueous acid solution, whereby the gallium in the organic phase transfers to the aqueous phase separating the gallium from the aqueous phase.

The acids used are preferably hydrochloric and hydrobromic acid. The concentration of the concentrated acid solution is preferably from 5 M to 8M and that of the dilute solution from 1.3 M to 2.2 M.

Further it can be considered, if it is desired to obtain the gallium less purified, to operate according to the following steps:

putting the aqueous solution into contact with a water-insoluble substituted hydroxyquinoline in solution in a water-insoluble organic solvent as represented by halogenated or non-halogenated aliphatic and aromatic hydrocarbons, in such a way that the gallium and a certain quantity of sodium and aluminum pass from the aqueous phase to the organic phase, separating the organic phase from the aqueous phase, putting the organic phase into contact with an aqueous solution of an acid to transfer the gallium, sodium and the aluminum in the organic phase to the aqueous phase, separating the aqueous phase from the organic phase, recovering of the gallium sodium and aluminum.

The acids solutions used are preferably either solutions of sulfuric or nitric acids in the concentration above to 1.6 M, or hydrochloric or bromhydric acids in the concentration from 1.3 M to 2.2 M.

In the gallium extracting stage described in the aforementioned patent, it may be advantageous to add substances with an alcohol function, e.g. heavy alcohols like N-decanol and isodecanol and various heavy phenols as well as various other solvating compounds, e.g. certain phosphoric esters like tributyl phosphate, in the organic extraction phase, in known manner.

The concentration of substituted hydroxy quinoline in the organic phase need not be very high, for even a concentration as low as 2% gives good extraction of gallium, due to the far greater affinity of these chelating agents for gallium than for aluminum and sodium; in practice, however, concentrations in the order of 10% are more favorable and enable the majority of the gallium to be extracted.

Furthermore, although temperature is not a critical parameter for obtaining good results by the method described in U.S. Pat. No. 3,971,843, it is advantageous for the extraction stage to be carried out at a fairly high temperature, in practice below 100° C. and preferably from 50° to 80° C. It may be added that, in industrial practice, the solutions generally treated are aluminate solutions from the Bayer process, particularly solutions described as "decomposed", which are at a temperature in the vicinity of 50° C., and, although this temperature is less favorable than a higher one, it is nevertheless sufficient to give satisfactory extraction yields. Moreover the stage where the solvent is regenerated and the gallium recovered is carried out in such a way that the organic phase is treated with an acid solution to recover the gallium, at a temperature below that of the extraction stage and preferably near ambient temperature.

The very basic solutions treated by the methods described are particularly ones in which the OH⁻ concentration may go up to 13-14 ions g/l. Thus the sodium aluminate lyes from the Bayer process, which are treated preferably by this method, generally have a composition corresponding to:

Na₂O : from 100 to 400 g/l
Al₂O₃ : from 40 to 150 g/l the so-called "decomposed" lyes generally have a composition such as:

Na₂O : from 150 to 200 g/l
Al₂O₃ : from 70 to 100 g/l

In industry, installations used for this method are laid out as follows. The sodium aluminate solution, with its alumina content reduced following its "decomposition", and the organic phase comprising the selected chelating agent, a solvent and possibly substances with an alcohol function and other solvating compounds are passed into a first counter current extracting apparatus. A large proportion of the gallium passes into the organic phase, the proportion depending on the respective flow rates of the two liquids. Aluminum, sodium and certain impurities also pass into the organic phase. In another extracting apparatus, the resulting organic phase is put into contact with a first regenerating solution, comprising a dilute strong acid or a concentrated strong chelating acid; in both cases this leaves virtually only gallium in the organic phase. The latter organic phase is then treated in a third counter current extracting apparatus, where it is put into contact with a strong acid for the purpose of recovering the gallium, and is then washed with water before the organic phase is recycled into the first counter current extracting apparatus. The acid solution, which has recovered the gallium, is then treated to complete its purification, then the gallium is extracted from it.

Further a simple industrial apparatus can be used in the case of the desire for a less purified gallium. Such type of apparatus includes a first apparatus of extraction as described hereinabove, at the exit of this first apparatus the organic phase is treated in a counter current extracting apparatus where it is put into contact with a solution of a strong acid for the purpose of recovering the gallium, sodium and aluminum.

It has been found that extended use of alkenyl 8-hydroxy quinoline in a gallium extracting unit by the methods described in the aforementioned patent leads to their gradual degradation, resulting in a reduction in their extracting power. In accordance with the practice of this invention, it has been discovered that there is a group of certain hydroquinolines which have been found to have a stability which does not deteriorate with prolonged use, and which retain the remarkable initial properties of the alkenyl 8-hydroxy quinolines described in the aforementioned patent for extracting gallium from sodium aluminate lyes.

The present invention represents an important improvement over the process of the aforementioned patent in the method of recovering the gallium contained in very basic aqueous solutions by liquid/liquid extraction, using an organic phase chiefly consisting of water-insoluble substituted hydroxyquinolines and an organic solvent, characterized in that the substituted hydroxyquinolines are selected from the group represented by the general formula:

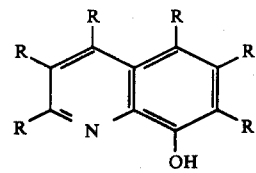

wherein R is an alkyl radical or a hydrogen.

In a preferred embodiment of the invention one of the alkyl radicals R has 5 to 20 carbon atoms. Below about 5 carbon atoms, the substituted hydroxyquinolines, according to the invention, are generally found to have a solubility which becomes too great in an acid or basic medium, thus making their use uneconomical due to the subsequent losses. Above about 20 carbon atoms, the substituted hydroxyquinolines according to the invention have a viscosity which makes them difficult to use.

In another preferred embodiment of the invention, the radical R is located in the 7 position on the 8-hydroxyquinoline ring and the preferred substances used in the method of the invention have the general formula

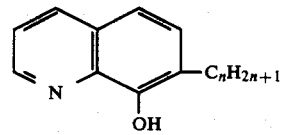

wherein n is preferably between 5 and 20.

The hydroxyquinolines of the invention enable the gallium present in very basic aqueous solutions, particularly in sodium aluminate lyes from the Bayer process, to be almost totally extracted without any loss in the course of time.

The embodiments of the method are those referred to above.

The following examples are given to illustrate the invention.

EXAMPLE 1

This example illustrates the degradation of alkenylhydroxyquinolines and the non-degradation of alkylhydroxyquinolines, employed in the practice of this invention, under conditions of basicity equivalent to those of an aluminate lye from the Bayer process.

The following hydroxyquinolines were subjected to a rapid degradation test at 150° C. in a 5M NaOH medium, the test being designed to classify the various products. The degradation rate is measured by chromatographic analysis of the resultant products in the gaseous phase after 24 and 72 hours.

| hydroxyquinoline tested | Degradation rate after | |
|---|---|---|
| | 24 hours | 72 hours |
| β alkenyl hydroxyquinoline | 5% | 50% |

| hydroxyquinoline tested | Degradation rate after | |
|---|---|---|
| | 24 hours | 72 hours |
| α alkenyl hydroxyquinoline 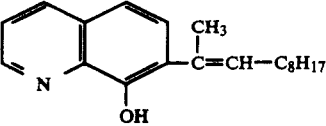 | 100% | |
| alkylhydroxyquinoline 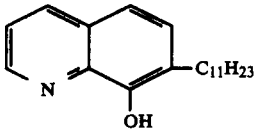 | No perceptible degradation | No perceptible degradation |

EXAMPLE 2

This example illustrates the method of the invention when use is made of hydroxyquinoline A of the formula

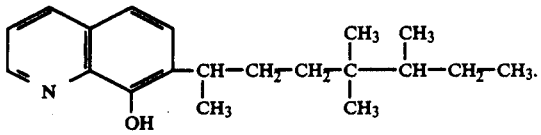

The gallium is extracted in an industrial extracting installation operating with continuous counter current flow, as described in this application. A sodium aluminate solution, composed of 90 g per liter $Al_2O_3$, 185 g/l $Na_2O$ and 250 mg/l Ga and an organic phase comprising an 8% solution of A in a 90-10 kerosene-decanol mixture is passed into a first counter current extracting apparatus in counter current flow. The extracting temperature is 50° C., the time of residence 1 hour and the ratio of the phases =1. In the second extracting apparatus, the organic phase is put into contact with a regenerating solution comprising 6 M hydrochloric acid. In the third extracting apparatus, operating at ambient temperature, the organic phase is put into contact with a 1.8 M hydrocholoric acid solution. The gallium recovery rate is a function of the time of operation of the installation. After 1000 hours of operation the gallium recovery rate is found to have maintained its initial value of 75%.

EXAMPLE 3

This example is given as a comparison and illustrates the degradation of the gallium recovery rate in the course of time, when operating in the same installation and under the same conditions as in Example 2, using an alkenyl hydroxyquinoline B of the formula

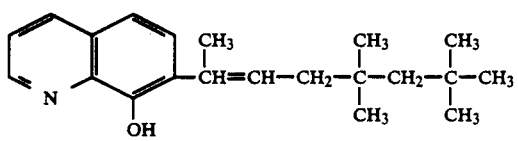

The results are as follows:

| Operating time | Gallium recovery rate |
|---|---|
| 1 H | 76% |
| 10 H | 48% |
| 40 H | 34% |
| 280 H | 20% |
| 760 H | 18% |

Furthermore the effectiveness of regeneration by HCL remains excellent. The recycled organic phase, in all cases, contains less than 5 mg/l of gallium before fresh contact with the Bayer lye.

It is obviously possible to extract the gallium with product B. In this case, however, if a suitable gallium extraction rate is to be maintained, more of product B has to be added in the course of extraction, the main disadvantage of this being that it is uneconomical.

We claim:

1. A process for the selective recovery of gallium values from those aluminum and sodium values contained in a basic aqueous sodium aluminate lye solution thereof, comprising liquid/liquid extracting such basic aqueous sodium aluminate lye solution with an organic phase which comprises a water-insoluble alkylated hydroxyquinoline extractant dissolved in an organic solvent therefor, said hydroxyquinoline extractant having the structural formula:

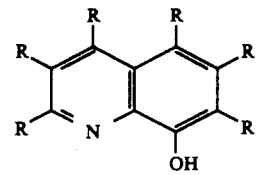

wherein R is hydrogen or alkyl, at least one R being an alkyl radical having from 5 to 20 carbon atoms, and whereby the gallium values and a fraction of the aluminum and sodium values are transferred into said organic phase, next separating said organic phase from said basic aqueous aluminate phase, and recovering the gallium values from said organic phase.

2. The process as defined by claim 1, said hydroxyquinoline extractant having the structural formula:

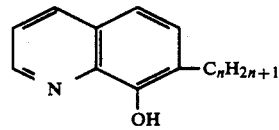

wherein n is a number ranging from 5 to 20.

3. The process as defined by claim 2, said hydroxyquinoline extractant having the structural formula:

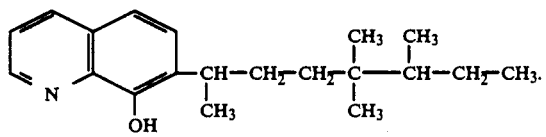

4. The process as defined by claim 2, wherein the basic aqueous solution extracted with the organic phase comprises a sodium aluminate lye solution emanating from the production of alumina by the Bayer process, and containing gallium, aluminum and sodium values.

5. The process as defined by claim 2, wherein said gallium values are recovered by treating the organic phase with an acidic medium.

6. The process as defined by claim 4, comprising the steps of:
(i) contacting the aqueous sodium aluminate solution with the organic phase, whereby gallium values and part of the amount of sodium and aluminum values are extracted from the aqueous phases to the organic phase;
(ii) separating the organic phase from the aqueous phase;
(iii) contacting the organic phase with a dilute aqueous solution of an acid, to extract sodium and aluminum values from the organic phase, and maintaining the gallium values in solution in the said organic phase;
(iv) separating the organic from the aqueous phase and contacting the remaining organic phase with a more concentrated aqueous acid solution, to transfer the gallium values from the organic phase to the aqueous phase; and
(v) separating the gallium values from the aqueous phase.

7. The process as defined by claim 6, wherein the acid comprises hydrochloric, sulfuric or nitric acid.

8. The process as defined by claim 6, wherein the concentration of the dilute aqueous acid solution ranges from 0.4 M to .8 M.

9. The process as defined by claim 6, wherein the concentration of the more concentrated aqueous acid solution is greater than 1.6 M.

10. The process as defined by claim 4, comprising the steps of:
(i) contacting the aqueous sodium aluminate solution with an organic phase, whereby gallium values and a certain amount of sodium and aluminum values are extracted from the aqueous to the organic phase, and in which the organic solvent is selected from the group consisting of halogenated and non-halogenated aliphatic and aromatic hydrocarbons;
(ii) separating the organic phase from the aqueous phase;
(iii) contacting the organic phase with a concentrated aqueous solution of and acid capable of chelating the gallium in anionic form, the gallium values remaining in solution in the organic phase while the sodium and aluminum values are transferred into the aqueous phase;
(iv) separating the organic phase from the aqueous phase and contacting the remaining organic phase with a dilute aqueous acid solution, whereby gallium values transfer from the organic to the aqueous phase; and
(v) separating the gallium values from the aqueous phase.

11. The process as defined by claim 10, wherein the acid comprises hydrochloric or hydrobromic acid.

12. The process as defined by claim 10, wherein the concentrated aqueous acid solution has a concentration ranging from 5 M to 8 M.

13. The process as defined by claim 10, wherein the concentration of the dilute aqueous acid solution is less than 2.2 M.

14. The process as defined by claim 6, wherein the first stage of the process, the contacting of the aqueous sodium aluminate solution with the organic phase is carried out at an elevated temperature of less than 100° C.

15. The process as defined by claim 6, wherein the organic phase comprising gallium values is treated with an aqueous acid solution at a temperature below that of the first stage of contacting the aluminate solution with the organic phase.

16. The process as defined by claim 15, wherein the temperature used is ambient temperature.

17. The process as defined by claim 4, comprising the steps of:
(i) contacting the aqueous solution with the water-insoluble substituted hydroxyquinoline in solution in a water-insoluble organic solvent selected from the group consisting of halogenated or non-halogenated aliphatic and aromatic hydrocarbons, whereby the gallium value and part of the amount of sodium and aluminum values are extracted from the aqueous phase to the organic phase;
(ii) separating the organic phase from the aqueous phase;
(iii) contacting the organic phase with an aqueous solution of an acid, whereby the gallium, sodium and the aluminum values in the organic phase are transferred to the aqueous phase;
(iv) separating the aqueous phase from the organic phase; and
(v) recovering the gallium values together with sodium and aluminum values.

18. The process as defined by claim 17, wherein the acid comprises sulfuric, nitric, hydrochloric or hydrobromic acids.

19. The process as defined by claim 18, in which the concentration of the sulfuric and nitric acids is above 1.6 M.

20. The process as defined by claim 18, wherein the concentration of hydrochloric and hydrobromic acids ranges from 1.3 to 2.2 M.

21. The process as defined by claim 18, wherein the first stage of the process, comprising contacting the aqueous sodium aluminate solution with the organic phase, said contacting is carried out at elevated temperature of less than 100° C.

22. The process as defined by claim 18, wherein the organic phase containing gallium values is treated with an aqueous acid solution at a temperature below that of the first stage for contacting the aluminate solution with the organic phase.

23. The process as defined by claim 1, said organic phase further comprising an alcohol, another solvating compound, or both.

* * * * *